July 7, 1953 C. H. PEASE 2,644,175
QUEEN AND DRONE TRAP
Filed Feb. 20, 1951
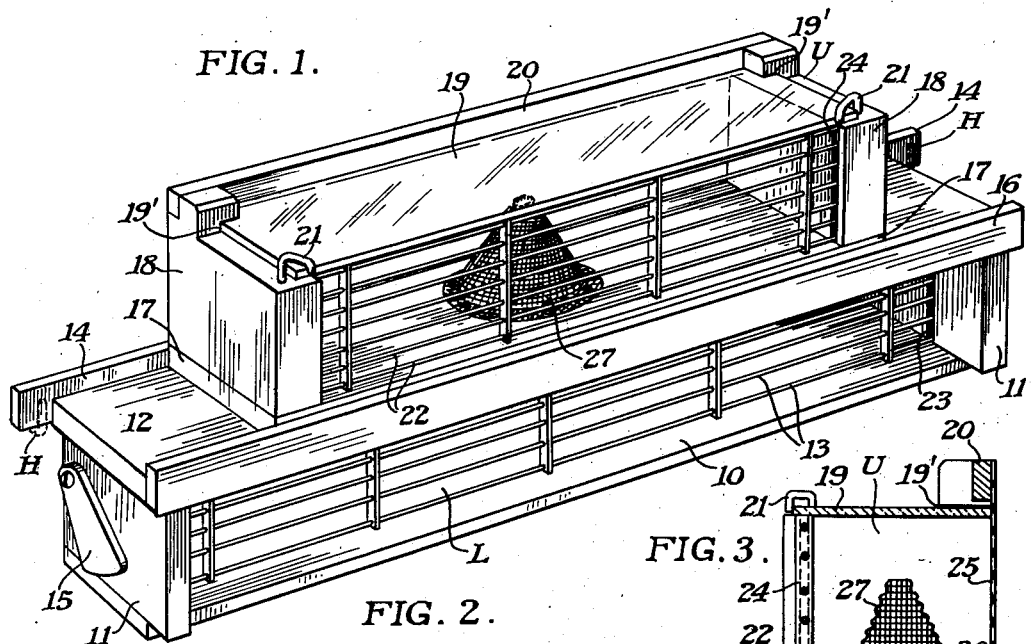
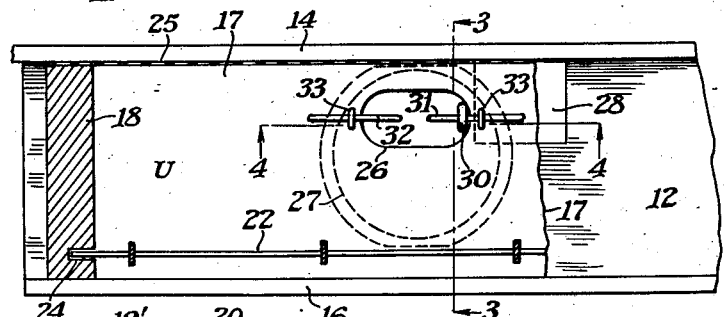
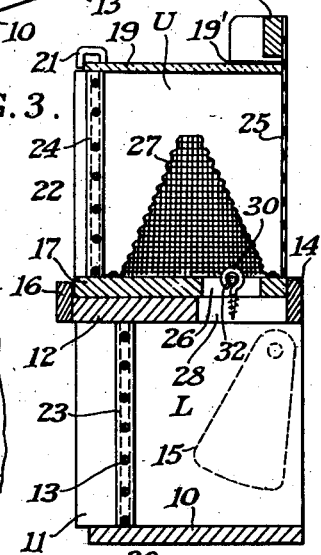
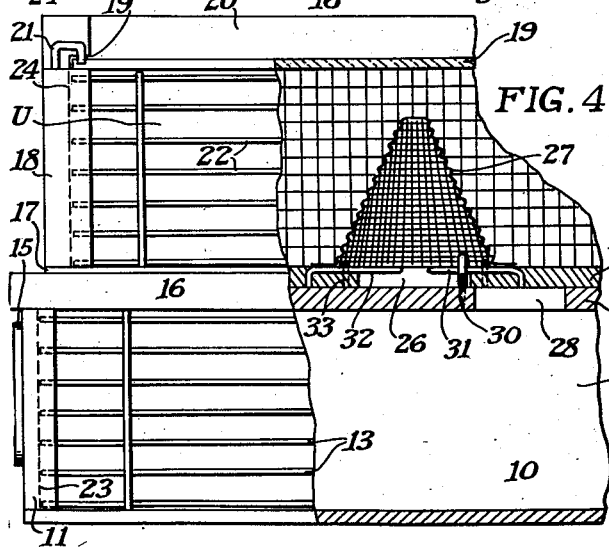
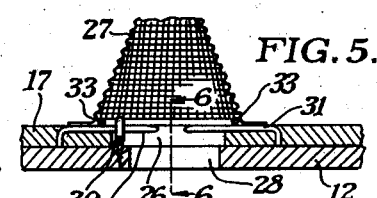
CHARLES H. PEASE
INVENTOR
BY Clarence W. Carroll
AGENT Patented July 7, 1953

2,644,175

UNITED STATES PATENT OFFICE 2,644,175

QUEEN AND DRONE TRAP

Charles H. Pease, Canaan, Conn.

Application February 20, 1951, Serial No. 211,882

6 Claims. (Cl. 6—7)

This invention relates to queen and drone traps, and particularly to a device which will confine the drones of a beehive so that they may be disposed of or destroyed, and which also will prevent a queen bee from leaving a hive with an emerging swarm.

Queen and drone traps of a more or less conventional design have been used by apiarists for many years, and heretofore have consisted of two inseparable compartments, with a horizontal septum between them, both with drone-confining front walls, usually including bars or slots that will permit worker bees to pass in and out and prevent queens or drones, both of which are larger than workers, from escaping from or entering a hive. An opening in the septum is usually covered by a suitable "bee-escape" that will permit all bees to pass from the lower to the upper compartment, and either prevent or discourage queens or drones from returning to the lower compartment where they might re-enter the hive. Traps made as aforesaid do not usually include any means whereby a queen may be readmitted to the hive by the apiarist.

The present invention contemplates a two-compartment trap in which the upper compartment, which will imprison drones or a queen, may be readily removed so that dead drones can be discarded.

A further novel feature is the provision of means whereby the upper compartment may be moved bodily upon the lower compartment and relative thereto, in a direction corresponding to the longer dimension of the trap, i. e., transversely of a beehive.

A further object of the invention is the provision of stops which limit the movement of the upper compartment, so that at one extreme of its travel a bee-escape in the bottom of the upper compartment is aligned with a port in the top wall of the lower chamber, and then at the other extreme of its travel the bee-escape is moved past said port, so that all bees may move from the upper to the lower compartment or vice versa, without hindrance.

A further object is to so construct the trap that the upper compartment may not be lifted from the lower compartment at either end of its permissible movement, but may be freed at some intermediate point. Other objects and advantages of the trap will be clearly set forth in the following specification, which is intended, in conjunction with the accompanying drawings, to enable any experienced beekeeper to use it.

The invention as herein described and illustrated is a practical improvement of the trap covered by my pending application for United States Letters Patent, Serial No. 124,368, filed October 29, 1949, now Patent No. 2,578,634.

In the drawings:

Fig. 1 is a perspective elevation, viewed from the front, of an assembled queen-and-drone trap constructed in accordance with the present invention;

Fig. 2 is a partial horizontal section taken at the level of the floor or bottom of the upper compartment, with the latter moved to its extreme left position;

Fig. 3 is a vertical transverse section on line 3—3 of Fig. 2, looking toward the end which is at the left in Fig. 1;

Fig. 4 is a vertical view, partly front elevation and partly in section on line 4—4 of Fig. 2;

Fig. 5 is a fragmentary section similar to parts of Fig. 4, but with the bee-escape cone covering the escape port in the top wall of the lower compartment; and Fig. 6 is a fragmentary section, enlarged, on line 6—6 of Fig. 5.

Referring first to the overall illustration, Fig. 1, the trap comprises, broadly, a lower compartment L and an upper compartment U, the latter slideable on the top wall of the former, within restricted limits.

More specifically, the lower compartment has a bottom 10, ends 11, and a top wall 12. The front of this compartment is defined by a "drone-proof" grille 13, of a type common to traps in commercial use; that is, the bars of the grille are spaced to admit worker bees but will not permit a queen or drones to pass.

The lower compartment L has no rear wall, and therefore is open toward the hive. To attach the trap to the front of a beehive, and to completely cover the entrance, a cleat 14 may extend across the rear of the upper wall 12, and beyond the end walls 11, so that hooks or similar fastenings on the hive, shown at H in broken lines, may engage the cleat and prevent the trap from accidental displacement or from tipping forward. Wedges 15 may also be employed to center the trap and to plug any slight gaps that may exist between the trap ends 11 and the sidewalls of a hive.

Across the front of the upper wall 12 is a second cleat 16. Both cleats 14 and 16 project above the top of the compartment L, and constitute guides for the upper compartment U, so that, as hereinbefore mentioned, the latter may be slideable on the top 12.

The compartment U has a bottom 17 and ends 18, a removable transparent top 19 of glass, or a non-frangible plastic, which latter may be retained in notches 19' against a rear upper rail 20 and may be removed by turning aside hooks 21 set in the ends 18; this compartment has a front grille 22 similar to the grille 13. Both grilles, 13 and 22, are set in slots 23, 24, respectively; in the ends 11 and 18. The grille 22 may be lifted out of grooves 24 after the cover 19 is removed. The back of compartment L is covered by screen or perforated metal 25, or may be solid wood or other material.

An opening or escape port 26 is provided in the bottom 17 of upper compartment U, and is covered by an "escape cone" 27, the open top of which is large enough to permit drones or queens to pass upwardly through it. When they have once passed through the cone, neither worker bees, drones, nor queens are ever likely to attempt to return to the lower compartment by that route. However, no bees can move upwardly through the cone unless the port 26 is over, and registered with, an opening 28 in the top wall 12 of lower compartment L (Fig. 5). This may be considered the normal condition for use of the device as a drone trap. In such a condition the two compartments L and U occupy the relation to each other illustrated in Fig. 1, and Fig. 5.

When the drones of a hive attempt to fly out, they cannot pass the grille 13, so they soon crawl up through the cone 27, and accumulate in compartment U, and then cannot escape through grille 22 either. The beekeeper may readily see through the transparent top 19 and will of course want to lift off compartment U, remove the top 19, and dispose of the drones, which will not live more than a few hours when so confined.

Obviously, some means should be provided for attaching compartment U to compartment L so that wind or small animals will not dislodge it and permit drones to escape. It is equally desirable that compartment U shall be easily and quickly detachable, as a time-saving factor. To these ends a construction such as is shown in Figs. 2, 3 and 4 may be employed.

A common screweye 30 is fixed in the top wall 12 of compartment L, closely adjacent to the port 28. At each end of port 26 in the bottom 17 of compartment U are oppositely disposed spikes or prongs 31, 32 the ends of which are spaced apart about twice the thickness of the eye 30. These may be secured to the bottom 17 by any suitable means.

It is apparent in viewing Fig. 4 that if the compartment L is so moved leftward between the guides 14 and 16 that the prong 31 enters the eye 30, the compartment U cannot be lifted off compartment L, and conversely, if U is moved to the right to cause prong 32 to enter the eye, U is again restrained from removal. The eye 30 acts as a limit stop in either of these positions by contacting one or the other end of port 26. Then, if U is stopped, with the eye 30 midway between the ends of prongs 31, 32 it may be lifted off from L.

As before stated, the two compartments normally are in the relation of Fig. 5, so that drones may pass upward through cone 27. If a queen has tried to decamp with a swarm (the workers having issued through grille 13), she will not be able to follow the workers but will crawl up the cone and be trapped in compartment U, which may then be removed by the apiarist so that he may return the queen to the hive.

The construction set forth above represents a preferred form of the invention, readily produced in quantity, and may be readily installed and used by apiarists of little experience. The invention is not intended to be limited to a trap exactly like the example here defined, but is of a scope encompassed by the following claims.

What I claim and desire to secure by Letters Patent of the United States is:

1. A queen and drone trap comprising, in combination, primary and secondary trap members each constituting a substantially rectangular walled compartment having one drone-confining worker-permeable wall; means for detachably securing the primary trap member across the entrance of a beehive with free access from said entrance into said trap member; guides for slideably guiding the secondary trap member along the primary trap member to various positions thereon; apertured meeting walls on both trap members; a bee-escape device covering the aperture in the secondary trap member whereby when the secondary member is moved to one position a non-return bee passage is established from the primary to the secondary trap member, and when said secondary member is moved to another position said passage is closed; and interengaging means on both trap members tending to render them inseparable in either of said conditions.

2. A queen and drone trap comprising, in combination, two hollow trap members each constituting a walled compartment; means for attaching the first trap member across the entrance of a beehive and means on the first trap member for mounting and guiding the second trap member with its bottom wall substantially in contact with the first trap member, the contacting wall of one member having an aperture covered by an escape cone or the like, and the contacting wall of the other member having at least one uncovered aperture adapted to register with the escape cone when the second trap member is moved to one extreme of its travel; a drone-confining worker-permeable wall in each trap member; and means for preventing separation of the trap members when the aperture in either member is aligned with the aperture in the other member.

3. A queen and drone trap comprising, in combination, a lower trap member adapted to be mounted across the entrance of a beehive, and an upper trap member, each of said members constituting a walled compartment and each member having one drone-confining wall; a top wall in the lower member having an aperture and a bottom wall in the upper member having an aperture covered by a bee-escape device, said upper trap member being movable in guides provided on the lower trap member and means for limiting such movement including interengaging elements tending to retain the trap members in sliding contact, whereby the upper member may be selectively moved to provide a one-way bee passage from the lower trap member into the upper trap member or to close said passage.

4. A queen and drone trap comprising, in combination, two substantially rectangular walled hollow members, one of said members constituting a primary trap member adapted for attachment to the front of a beehive across the entrance thereof and provided with guides and fixed stops and the other member constituting a secondary trap member slideably mounted on the primary trap member and provided with means for engaging said guides and fixed stops; a drone-confining, worker-permeable wall in each trap member; an apertured top wall in the primary trap member and a wall in the secondary trap member contacting said apertured wall and having an aperture covered by a bee-escape device, said contacting walls being so arranged that when the upper trap member is moved to engage one of the fixed stops aforesaid the apertures are aligned to provide a one-way bee passage from the lower trap member into the upper trap member, and when the upper trap member is moved to engage the other fixed stop the apertures are misaligned to close the bee passage.

5. A queen and drone trap comprising, in combination, a primary trap member adapted for attachment across the entrance of a beehive, and a secondary trap member arranged for movement along and upon the primary trap member, each of said members constituting a walled compartment with one drone-confining wall and one apertured wall; an escape come surrounding the aperture in the secondary member, whereby when said secondary member is moved to align said aperture with the aperture in the primary member a non-return bee passage is provided from the primary member to the secondary member; guides on the primary member permitting the secondary member to be moved as aforesaid to another position to close the bee passage; and interengaging means on both trap members tending to render them inseparable in the aligned and misaligned positions.

6. A queen and drone trap comprising, in combination, upper and lower compartmental members each having a drone-confining front wall, the upper member being slideably supported in guides on the lower member; a top wall on the lower member having an aperture, and a bottom wall on the upper member having a corresponding aperture covered by a bee-escape device to provide a non-return passage for drones from the lower to the upper member when the upper member is positioned to align both apertures, said passage being obstructed to prevent passage of any bees to the upper trap member when the moveable member is positioned to misalign the apertures; means for attaching one trap member to a beehive across the entrance thereof; and interengaging elements on each trap member arranged to definitely position the moveable member in the guides as aforesaid and to prevent separation of the two trap members in either the aligned or misaligned positions.

CHARLES H. PEASE.

References Cited in the file of this patent

UNITED STATES PATENTS

| Number | Name | Date |
|--------|------|------|
| 593,712 | Williams | Nov. 16, 1897 |
| 945,407 | Nichols | Jan. 4, 1910 |
| 1,017,233 | Rahn | Feb. 13, 1912 |
| 1,462,933 | Cottam | July 24, 1923 |